United States Patent
Tubert et al.

(10) Patent No.: US 12,033,305 B2
(45) Date of Patent: Jul. 9, 2024

(54) FILTERING DEVICE, ASSOCIATED SYSTEM AND METHOD

(71) Applicant: STMicroelectronics (Grenoble 2) SAS, Grenoble (FR)

(72) Inventors: Cedric Tubert, Saint-Egreve (FR); Jeremie Teyssier, Grenoble (FR); Gregory Roffet, Coublevie (FR); Stephane Drouard, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 245 days.

(21) Appl. No.: 17/112,341

(22) Filed: Dec. 4, 2020

(65) Prior Publication Data

US 2021/0183018 A1 Jun. 17, 2021

(30) Foreign Application Priority Data

Dec. 17, 2019 (FR) ........................................ 1914576

(51) Int. Cl.
*G06T 5/70* (2024.01)
*G06T 5/20* (2006.01)
(Continued)

(52) U.S. Cl.
CPC ................. *G06T 5/70* (2024.01); *G06T 5/20* (2013.01); *H04N 5/21* (2013.01); *H04N 25/60* (2023.01);
(Continued)

(58) Field of Classification Search
CPC . G06T 5/002; G06T 5/20; G06T 2207/20012; G06T 2207/20192;
(Continued)

(56) References Cited

U.S. PATENT DOCUMENTS

| 2009/0010328 A1* | 1/2009 | Pan ...................... H04N 19/186 |
| | | 375/E7.076 |
| 2009/0087121 A1* | 4/2009 | Han .......................... G06T 5/20 |
| | | 382/266 |

(Continued)

FOREIGN PATENT DOCUMENTS

| EP | 0948195 A2 | 10/1999 |
| WO | 2017132600 A1 | 8/2017 |

OTHER PUBLICATIONS

Pritamdas1 et al, An adaptive switching filter based on approximated variance for detection of impulse noise from color images, Pritamdas et al. SpringerPlus (2016) 5:1969 (Year: 2016).*

(Continued)

*Primary Examiner* — Andrae S Allison
(74) *Attorney, Agent, or Firm* — Slater Matsil, LLP

(57) ABSTRACT

In an embodiment, a method includes: receiving data signals from a plurality of pixels of an array of pixels; generating a plurality of signal-to-noise ratios by determining signal-to-noise ratios for each respective pixel of the plurality of pixels on the basis of the data signals received from the respective pixel; and filtering the data signals received from each pixel of the plurality of pixels by using an adaptive filter configured on the basis of the plurality of the signal-to-noise ratios to generate filtered data signals.

14 Claims, 5 Drawing Sheets

(51) Int. Cl.
*H04N 5/21* (2006.01)
*H04N 25/60* (2023.01)

(52) U.S. Cl.
CPC .............. *G06T 2207/20012* (2013.01); *G06T 2207/20192* (2013.01)

(58) Field of Classification Search
CPC ............ G06T 2207/20216; H04N 5/21; H04N 5/357; G01S 7/4863; G01S 7/4873; G01S 17/10; G01S 17/894
See application file for complete search history.

(56) References Cited

U.S. PATENT DOCUMENTS

| | | | | |
|---|---|---|---|---|
| 2009/0097543 | A1* | 4/2009 | Pan | H04N 19/115 375/E7.076 |
| 2011/0081096 | A1* | 4/2011 | Kim | H04N 5/21 382/275 |
| 2014/0003495 | A1* | 1/2014 | Chuang | H04N 19/119 375/240.02 |
| 2014/0226905 | A1* | 8/2014 | Yahata | G06T 5/002 382/194 |
| 2015/0334318 | A1* | 11/2015 | Georgiev | G01S 7/493 348/46 |

OTHER PUBLICATIONS

Fabijanska et al, Noise adaptive switching median-based filter for impulse noise removal from extremely corrupted images, Special Issue on Imaging Systems and Techniques, Published in IET Image Processing Received on Jul. 26, 2009 (Year: 2009).*

* cited by examiner

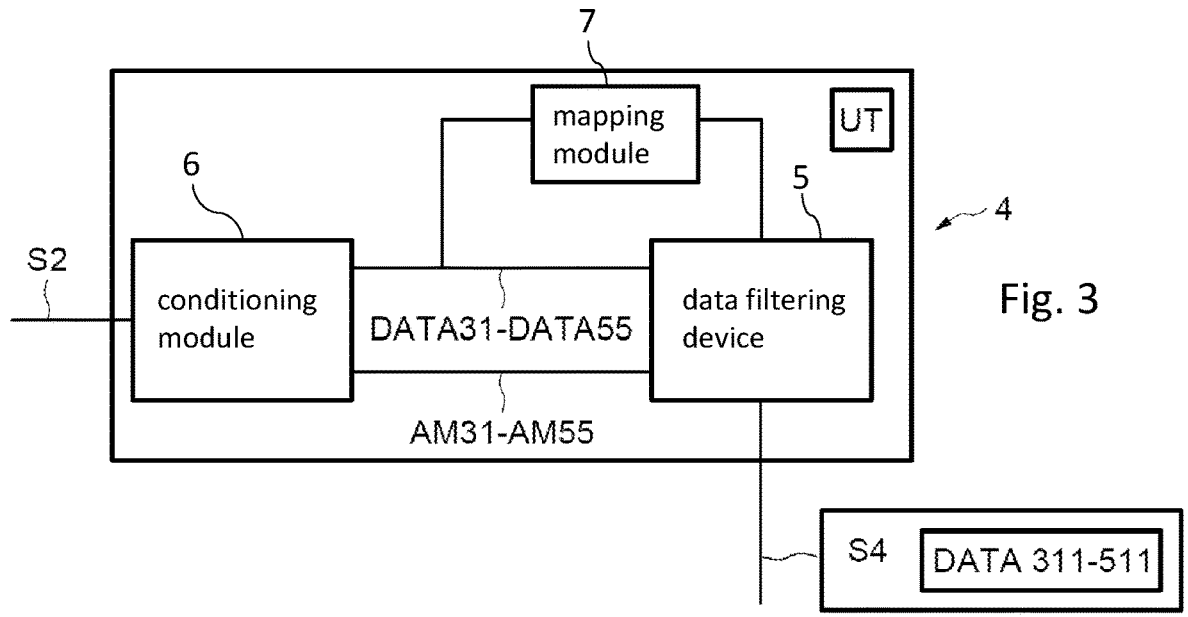

FILTERING DEVICE, ASSOCIATED SYSTEM AND METHOD

CROSS-REFERENCE TO RELATED APPLICATIONS

This application claims the benefit of French Patent Application No. 1914576, filed on Dec. 17, 2019, which application is hereby incorporated herein by reference.

TECHNICAL FIELD

The present disclosure relates generally to an electronic system and method, and, in particular embodiments, to a filtering device, associated system and method.

BACKGROUND

A time-of-flight sensor is particularly sensitive to noise arising from the sensor itself and from its environment, necessitating effective filtering.

However, existing filtering devices take only a limited number of parameters into account, such that the filtering is not optimal, lowering the quality of the representation of the scene.

There is a need to improve the filtering of data from time-of-flight sensors.

SUMMARY

Some embodiments relate to the filtering of data signals transmitted by pixels, and more particularly pixels of time-of-flight sensors that measure three-dimensional scenes.

Some embodiments configure a filtering device for filtering data signals generated by a pixel in an array of pixels according to the position of the pixel in the array and according to the signal-to-noise ratio of a plurality of pixels.

Some embodiments relate to a method for filtering data signals transmitted by pixels in an array of pixels comprising the operation of determining, for each pixel, a signal-to-noise ratio on the basis of the data signals transmitted by the pixel, and the operation of filtering the data from each pixel by using an adaptive filter configured on the basis of a plurality of the signal-to-noise ratios.

Using the signal-to-noise ratios to filter the noise in the data generated by the pixels in an array of pixels of a sensor makes it possible in particular to enhance the quality of the images.

In some embodiments, the signal-to-noise ratio is determined on the basis of the amplitude of the signal, of an ambient value and of a predetermined standard deviation.

In some embodiments, if the signal-to-noise ratio of the data signal from the pixel is below a first threshold, the filter is configured to average the data from the pixel on the basis of the data from pixels in the vicinity of the pixel (e.g., such as pixels immediately adjacent to the pixel, such as by using a 3×3 kernel).

In some embodiments, if the signal-to-noise ratio of the data signal is above the first threshold, the filtering operation comprises the operation of determining the data filtered from the pixel on the basis of a weighted combination of the data contained in the signals from the pixel and of the data contained in the signals from pixels in the vicinity of the pixel, the weighting coefficients being determined on the basis of the signal-to-noise ratio of the data signals from the pixel and of the data signals from the pixels neighboring the pixel and on the basis of data coefficients calculated on the basis of the data from the pixel and of the data from the pixels neighboring the pixel.

In some embodiments, if the signal-to-noise ratio is within an interval defined by the value of the first threshold minus a first difference and the value of the first threshold plus the first difference, the filtering operation comprises the operation of determining the data filtered from the pixel on the basis of a weighted combination between the average of the data from the pixel with the data from pixels in the vicinity of the pixel, and the weighted combination of the data from the pixel and from pixels in the vicinity of the pixel.

In some embodiments, the extent of the pixels neighboring the pixel is determined on the basis of the signal-to-noise ratio of the data signal from the pixel.

In some embodiments, the filtering is advantageously adapted according to the quality of the received data.

In some embodiments, the pixels are incorporated within a time-of-flight sensor.

Using the signal-to-noise ratios to filter the noise in the data signals generated by the pixels in an array of pixels of a time-of-flight sensor advantageously makes it possible in particular to enhance the quality of the images and the representation of scenes.

Some embodiments relate to a device for filtering data signals transmitted by pixels in an array of pixels, which device is configured to filter the data contained in the data signals on the basis of a plurality of signal-to-noise ratios calculated on the basis of the data signals.

In some embodiments, the device comprises a calculating module configured to calculate the signal-to-noise ratio of the data signals from each pixel, and an adaptive filter configured to filter data from each pixel on the basis of a plurality of the signal-to-noise ratios.

In some embodiments, the adaptive filter is configured to average the data contained in the data signal from the pixel with the data contained in the data signals from pixels in the vicinity of the pixel if the signal-to-noise ratio of the data signal from the pixel is below a first threshold, the filtered data from the pixel comprising the averaged data.

In some embodiments, the adaptive filter is configured to determine the data filtered from the pixel on the basis of a weighted combination of the data from the pixel and from pixels in the vicinity of the pixel if the signal-to-noise ratio of the data signal from the pixel is above the first threshold, the weighting coefficients being determined on the basis of the signal-to-noise ratio of the data signal from the pixel and of the data signals from the pixels neighboring the pixel and on the basis of data coefficients calculated on the basis of data from the pixel and data from the pixels neighboring the pixel.

In some embodiments, the adaptive filter is configured to determine the data filtered from the pixel on the basis of a weighted combination between the average of the data from the pixel with the data from pixels in the vicinity of the pixel, and of the weighted combination of the data from the pixel and of the data from pixels in the vicinity of the pixel, if the signal-to-noise ratio is within an interval defined by the value of the first threshold minus a first difference and the value of the first threshold plus the first difference.

In some embodiments, the device further comprises a selection module configured to determine the extent of the pixels neighboring the pixel on the basis of the signal-to-noise ratio of the data signal from the pixel.

Some embodiments relate to a system comprising a device such as defined above, and at least one sensor comprising an array of pixels, the device being connected to the sensor.

According to one embodiment, the sensor is a time-of-flight sensor.

BRIEF DESCRIPTION OF THE DRAWINGS

Other advantages and features of the invention will become apparent upon examining the detailed description of completely non-limiting embodiments and the appended drawings, in which:

FIG. 3 illustrates the sequencer of FIG. 1, according to an embodiment;

FIG. 4 illustrates a map generated by the mapping module of FIG. 3, according to an embodiment of the present invention;

DETAILED DESCRIPTION OF ILLUSTRATIVE EMBODIMENTS

Figures 1, 2:
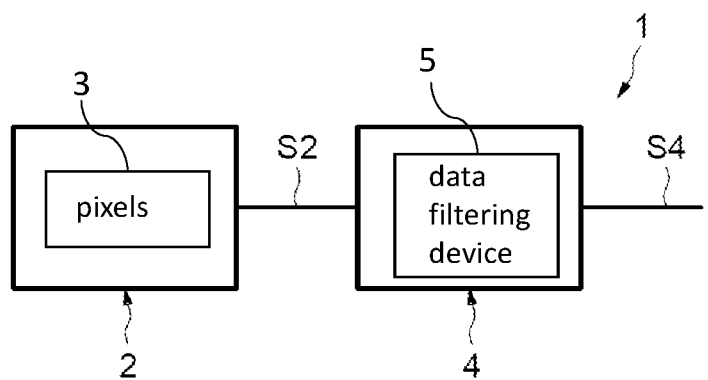
FIG. 1 illustrates a system, according to an embodiment of the present invention.
FIG. 2 illustrates the array of the sensor 2 of FIG. 1, according to an embodiment.

Reference is made to FIG. 1, which represents an exemplary embodiment of a system 1 comprising a sensor 2 comprising an array of pixels 3 and a sequencer 4 that is connected to the sensor 2.

The sequencer 4 is configured to condition and to filter the data contained in a signal S2 transmitted by the sensor 2, and comprises a data filtering device 5. In some embodiments, the sequencer is implemented by custom or general purpose controller or processor (e.g., digital signal processor) comprising combinatorial logic coupled to a memory.

In some embodiments, the sensor 2 may be a time-of-flight sensor.

The sequencer 4 delivers an output signal S4 on the basis of the input signal S2 received from the sensor 2.

FIG. 2 illustrates an exemplary embodiment of the array 3 of the sensor 2.

The array 3 comprises twenty-five pixels numbered 31 to 55, the pixel 31 being arranged at the center of the array 3.

Of course, the array 3 may comprise more or fewer than twenty-five pixels.

Reference is now made to FIG. 3, which illustrates an exemplary embodiment of the sequencer 4.

The sequencer 4 comprises the device for filtering data signals 5, a conditioning module 6 connected to the filtering device 5 and a mapping module 7 connected to the conditioning module 6 and to the filtering device 5.

The sequencer 4 further comprises a processing unit UT that controls the device for filtering data signals 5, the conditioning module 6 the mapping module 7 as described hereinafter.

The conditioning module 6 receives the input signal S2 comprising the data transmitted by the pixels 31 to 55 and generates, for each pixel 31 to 55, a data vector DATA31 to DATA55 comprising a numerator NUM31 to NUM55 and a denominator DEM31 to DEM55 from the received data.

The vectors DATA31 to DATA55 are transmitted to the device 5 and to the mapping module 7.

The conditioning module 6 further generates an ambient value AM31 to AM55 on the basis of the received data transmitted to the device 5.

The operation of determining the numerator, the denominator and the value of the ambient is known to a person skilled in the art and depends on the technology of the sensor 2.

In some embodiments, the ambient is obtained in particular on the basis of a combination of amplitudes of signals obtained from image captures of the same scene, the amplitudes being divided by an exposure time.

On the basis of the data vectors DATA31 to DATA55, the mapping module 7 generates a map 8, which can be seen in FIG. 4 that associates each pixel 31 to 55 with a vector DATA31 to DATA55 according to the position of the pixel 31 to 55 in the array 3.

The device for filtering data signals 5 is configured to filter the data vectors DATA31 to DATA55 on the basis of a plurality of signal-to-noise ratios SNR31 to SNR55 calculated on the basis of the data DATA31 to DATA55.

The device 5 transmits the output signal S4 comprising filtered data vectors DATA311 to 551.

Each filtered data vector DATA311 to DATA511 comprises the numerator NUM31 to NUM55 and the denominator DEM31 to DEM55 filtered by the filtering device 5, the vector DATA311 to DATA511 comprising a filtered numerator NUM311 to NUM551 and a denominator DEM311 to DEM551.

Figure 5:
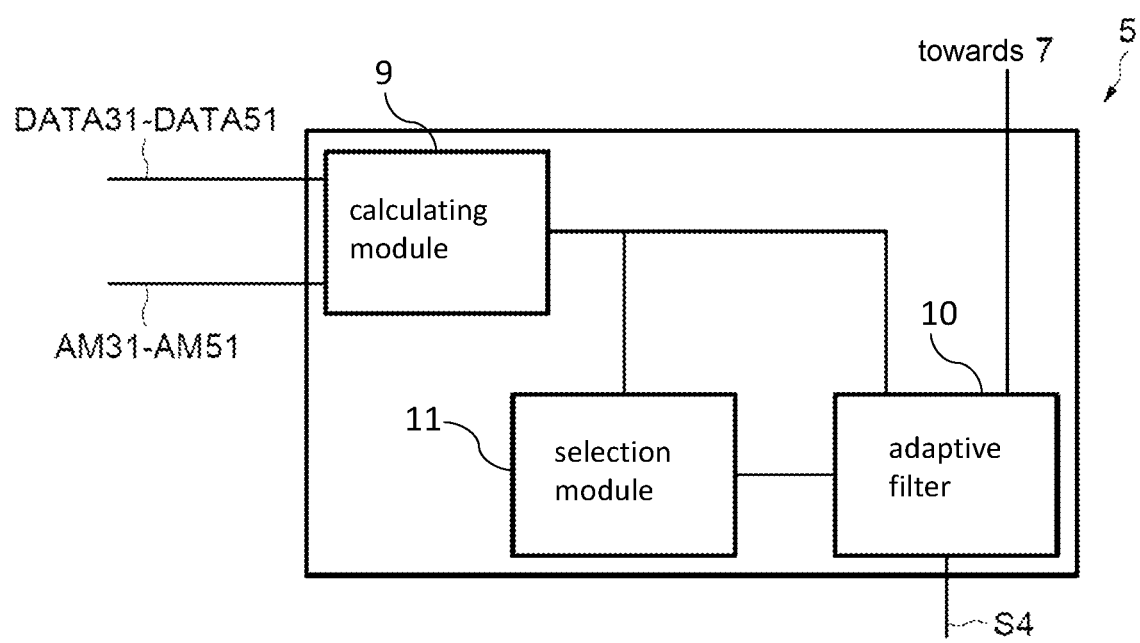
FIG. 5 illustrates the data filtering device of FIG. 1, according to an embodiment of the present invention.

FIG. 5 illustrates an exemplary embodiment of the device for filtering data signals 5.

The device 5 comprises a calculating module 9 configured to calculate the signal-to-noise ratio SNR31 to SN55 of the data signal from each pixel 31 to 55, an adaptive filter 10 configured to filter the data DATA31 to DATA55 from each pixel 31 to 55 on the basis of a plurality of signal-to-noise ratios SNR31 to SNR55, and a selection module 11 connected to the filter 10 and receiving, as input, the signal-to-noise ratio SNR31 to SNR55 of the signal from each pixel 31 to 55.

The data DATA31 from the center pixel 31 being filtered by the filtering device 5 is considered hereinafter.

Of course, all of the data DATA31 to 55 from the pixels 31 to 55 in the array 3 are filtered by the device 5.

Figure 6:
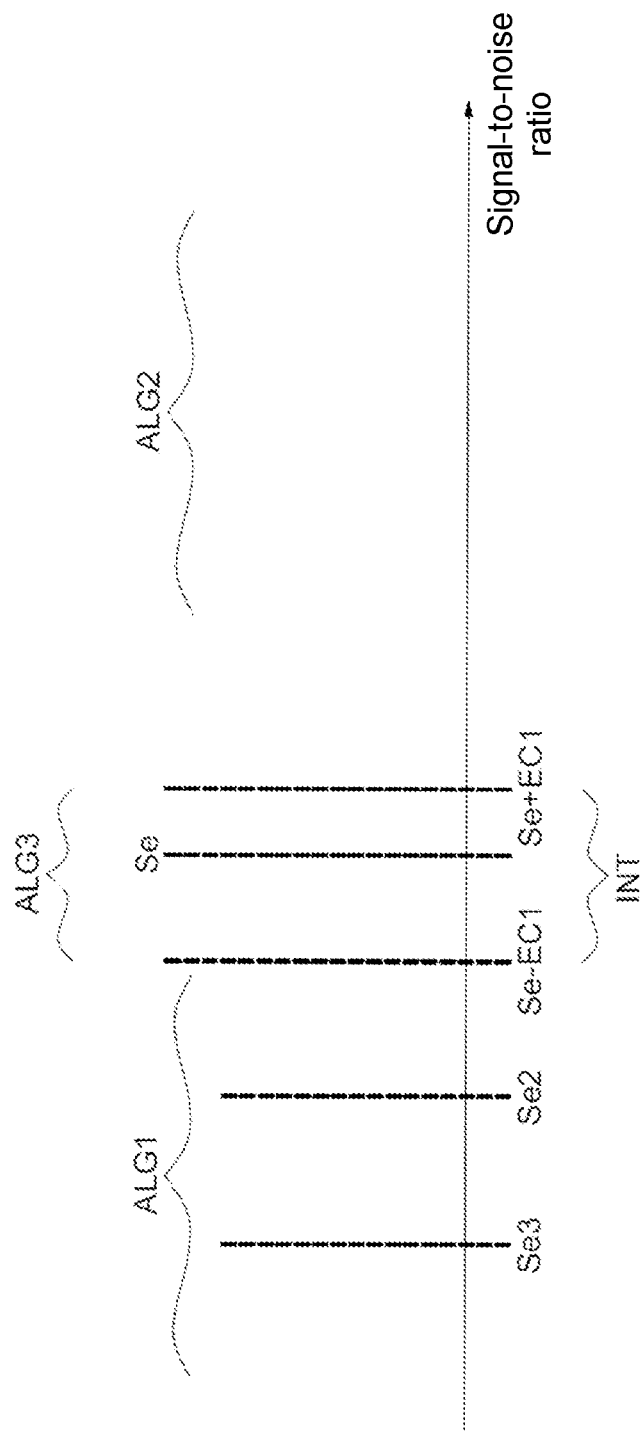
FIG. 6 illustrates a configuration of the adaptive filter of FIG. 5, according to an embodiment of the present invention.
Figure 7:
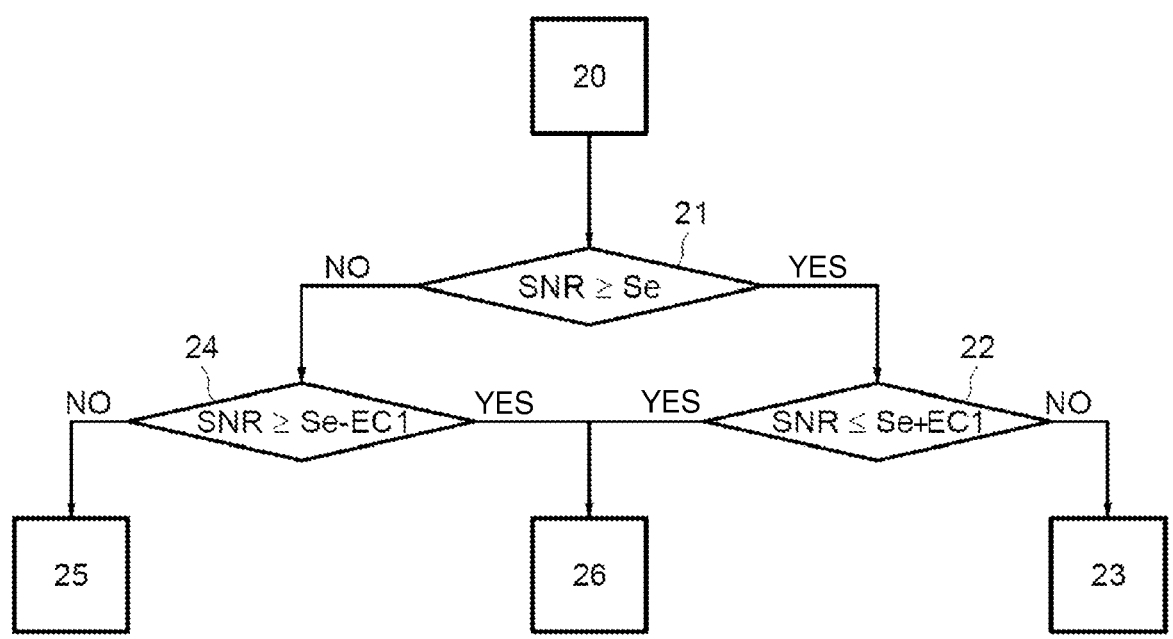
FIG. 7 illustrates a flow chart of an embodiment method for filtering data signals received from the array of FIG. 2, according to an embodiment of the present invention.

FIGS. 6 and 7 illustrate an exemplary implementation of the filtering device 5.

FIG. 6 schematically illustrates an exemplary configuration of the filter 10, the processing unit UT configuring the filter 10.

The filter 10 comprises two filtering algorithms ALG1 and ALG2 that are implemented according to the value of the signal-to-noise ratio SNR31.

If the value of the signal-to-noise ratio SNR31 is below a first threshold Se, a first algorithm ALG1 averages the data DATA31 from the pixel 31 with the data from pixels in the vicinity of the pixel 31, the filtered data DATA311 comprising the averaged data.

If the value SNR31 is above a first threshold Se, a second algorithm ALG2 determines the filtered data DATA311 on the basis of a weighted combination of the data from the pixel 31 and from pixels in the vicinity of the pixel.

The weighting coefficients are determined on the basis of the signal-to-noise ratio SNR31 of the data signal from the pixel 31 and of the data signals from the pixels neighboring the pixel 31 and on the basis of the data coefficients calculated on the basis of the data DATA31 from pixel 31 and of the data from the pixels neighboring the pixel 31 (for example bilateral filtering).

To decrease threshold effects, in some embodiments the filter 10 may comprise a third filtering algorithm ALG3 when the signal-to-noise ratio SN31 is within an interval INT defined by the value of the first threshold Se minus a first difference EC1 and the value of the first threshold Se plus the first difference EC1.

The third algorithm ALG3 determines the filtered data DATA311 on the basis of a weighted combination of the filtered data determined by the first and second algorithms ALG1 and ALG2.

The selection module 11 determines the extent Δ of the pixels neighboring the pixel 31 on the basis of the signal-to-noise ratio SN31 of the pixel 31.

According to the value of the signal-to-noise ratio SN31, the selection module 11 determines a pixel window, the pixel 31 being at the center of the window.

In a step 20 (FIG. 7), the calculating module 9 determines the signal-to-noise ratios SNR31 to SNR55:

$$SNR_i = \sqrt{\frac{AMP_i^2}{AM_i + 3.\sigma^2}} \quad (1)$$

with i varying from 31 to 55, AMPi being the amplitude of the data DATAi and σ being a standard deviation modelling the intrinsic noise of the sensor.

In some embodiments, the calculating module 9 sets up a map of the signal-to-noise ratios SNR31 to SNR55 which is similar to the map 8 associating each pixel 31 to 55 with a signal-to-noise ratio SNR31 to SNR55 according to the position of the pixel 31 to 55 in the array 3.

If the ratio SNR31 of the pixel 31 is above or equal to the first threshold Se (step 21), and if the ratio SNR31 of the pixel 31 is higher than the value of the first threshold Se plus the first difference EC1 (step 22), in step 23, the selection module 11 determines the extent Δ of the neighboring pixels (e.g., the selection module 11 determines the kernel size, which may be, e.g., 3×3, 5×5, 7×7, etc.).

It is assumed that the extent Δ comprises for example a window of eight pixels centered on the pixel 31.

In some embodiments, the extent Δ comprises the pixels 32 to 39.

The filtered numerator NUM$_i$ of a vector DATA$_i$ of a pixel i is equal to:

$$NUMi = \frac{COEFF1_i \cdot NUM_i + \sum_j^\Delta COEFF1_j \cdot NUM_j}{COEFF1_i + \sum_j^\Delta COEFF1_j} \quad (2)$$

where
COEFF1$_i$ is the weighting coefficient of the pixel i and COEFF1$_j$ is the weighting coefficient of the pixel j for the numerator calculation.

The coefficient COEFF1$_i$ is equal to the signal-to-noise ratio SNR$_i$ of the pixel i.

The coefficient COEFF1$_j$ of the pixel j included in the extent Δ is equal to:

$$COEFF1_j = SNR_j \cdot \alpha_j \quad (3)$$

where α$_j$ is the data coefficient of the pixel j calculated according to the following equation:

$$\alpha_j = \frac{1}{NUM_i - NUM_j} \quad (4)$$

Analogously, the filtered denominator DEM$_i$ of a vector DATA$_i$ is equal to:

$$DEMi = \frac{COEFF2_i \cdot DEM_i + \sum_j^\Delta COEFF2_j \cdot DEM_j}{COEFF2_i + \sum_j^\Delta COEFF2_j} \quad (5)$$

where
COEFF2$_i$ is the weighting coefficient of the pixel i and COEFF2$_j$ is the weighting coefficient of the pixel j for the denominator calculation.

The coefficient COEFF2$_i$ is equal to the signal-to-noise ratio SNR$_i$ of the pixel i.

The coefficient COEFF2$_j$ of the pixel j included in the extent Δ is equal to:

$$COEFF2_j = SNR_j \cdot \beta_j \quad (6)$$

where β$_j$ is the data coefficient of the pixel j calculated according to the following equation:

$$\beta_j = \frac{1}{DEM_i - DEM_j} \quad (7)$$

In this instance, the filtered numerator NUM311 of the vector DATA311 of 31 is equal to:

$$NUM311 = \frac{COEFF131 \cdot NUM31 + \sum_{j=32}^{39} COEFF1_j \cdot NUM_j}{COEFF131 + \sum_{j=32}^{39} COEFF1_j} \quad (8)$$

and the filtered denominator DEM311 of the vector DATA311 of 31 is equal to:

$$DEM311 = \frac{COEFF231 \cdot DEM31 + \sum_{j=32}^{39} COEFF2_j \cdot DEM_j}{COEFF232 + \sum_{j=32}^{39} COEFF2_j} \quad (9)$$

If the ratio SNR31 of the pixel 31 is below the first threshold Se (step 21), and if the ratio SNR31 of the pixel 31 is lower than the value of the first threshold Se minus the first difference EC1 (step 24), in step 25, the selection module 11 determines the extent Δ of the neighboring pixels.

If the signal-to-noise ratio SNR31 is within an interval defined by a second threshold Se2 and the value of the first threshold Se minus the first difference EC1, the selection module determines a first extent Δ1 of neighboring pixels such that the extent Δ is equal to the first extent Δ1, the value of the second threshold Se2 being lower than the value of the first threshold Se minus the first difference EC1.

The first extent Δ1 comprises for example a window of eight pixels 32 to 39.

If the signal-to-noise ratio SNR31 is within an interval defined by a third threshold Se3 and the second threshold Se2, the selection module determines a second extent Δ2 of neighboring pixels such that the extent Δ is equal to the second extent Δ2.

In some embodiments, the second extent Δ2 comprises for example a window of twenty-four pixels 32 to 55.

The filtered numerator $NUM_i$ of a vector $DATA_i$ of a pixel i is equal to:

$$NUMi = \frac{NUM_i + \sum_{j}^{\Delta k} NUM_j}{1 + Nb} \quad (10)$$

and the filtered denominator $DEM_i$ of a vector $DATA_i$ of a pixel i is equal to:

$$DEMi = \frac{DEM_i + \sum_{j}^{\Delta k} DEM_j}{1 + Nb} \quad (11)$$

where Nb is the number of pixels contained in the extent Δk, k being equal to 1 or 2.

The selection module 11 allows the filtering to be adapted according to the quality of the received data.

In this instance, if the signal-to-noise ratio SNR31 is between the second threshold Se2 and the first threshold Se minus the first difference EC1, the filtered numerator NUM311 is equal to:

$$NUM311 = \frac{NUM31 + \sum_{j=32}^{39} NUM_j}{1 + 8} \quad (12)$$

and the filtered denominator DEM311 of the vector DATA311 of 31 is equal to:

$$DEM311 = \frac{DEM31 + \sum_{j=32}^{39} DEM_j}{1 + 8} \quad (13)$$

If the signal-to-noise ratio SNR31 is between the third threshold Se3 and the second threshold Se2, the filtered numerator NUM311 is equal to:

$$NUM311 = \frac{NUM31 + \sum_{j=32}^{55} NUM_j}{1 + 24} \quad (14)$$

and the filtered denominator DEM311 of the vector DATA311 of 31 is equal to:

$$DEM311 = \frac{DEM31 + \sum_{j=32}^{55} DEM_j}{1 + 24} \quad (15)$$

If the value of the signal-to-noise ratio SNR31 is lower than the third threshold Se3, the pixel 31 is considered to be defective.

If the pixel 31 is defective, the filtered numerator NUM311 and the filtered denominator DEM311 are determined by replacing the numerator NUM31 and the denominator DEM31 with zero.

Of course, the first algorithm ALG1 may comprise more than two thresholds Se1 and Se2 for averaging the data from the pixels.

To avoid threshold effects, the first algorithm ALG1 may comprise gradual transition zones in proximity to the second and third thresholds Se2 and Se3, for example by linearly or logarithmically interpolating the filtered data in the transition zones.

If the ratio SNR31 of the pixel 31 is above or equal to the first threshold Se (step 21), and if the ratio SNR31 of the pixel 31 is lower than the value of the first threshold Se plus the first difference EC1 (step 22), or if the ratio SNR31 of the pixel 31 is below the first threshold Se (step 21), and if the ratio SNR31 of the pixel 31 is higher than or equal to the value of the first threshold Se minus the first difference EC1 (step 24), the method moves on to step 26.

In step 26, the filtered numerator NUM311 and the filtered denominator DEM311 are determined on the basis of a weighted combination of the values of the filtered numerator NUM311 and of the filtered denominator DEM311 produced by the first and second algorithms ALG1 and ALG2 as described above.

Using the signal-to-noise ratios SNR31 to SNR55 to filter the noise in the data generated by the pixels 31 to 55 of the sensor 2 makes it possible in particular to enhance the quality and the representation of scenes.

What is claimed is:

1. A method comprising:
   receiving, from a time-of-flight (ToF) sensor, data signals from a plurality of pixels of an array of pixels, wherein the array of pixels are incorporated within the ToF sensor, wherein the data signals from the plurality of pixels represent an image captured by the ToF sensor;
   generating, using a calculating module of a data filtering device, a plurality of signal-to-noise ratios by determining a respective signal-to-noise ratio for each respective pixel of the plurality of pixels on the basis of the data signals received from the respective pixel, wherein determining the respective signal-to-noise ratio for each respective pixel comprises determining the respective signal-to-noise ratio for each respective pixel based on an amplitude of the data signals received from the respective pixel, an ambient value, and a predetermined standard deviation; and
   filtering, using an adaptive filter of the data filtering device, the data signals received from each pixel of the plurality of pixels to generate filtered data signals, wherein the adaptive filter is configured on the basis of the plurality of the signal-to-noise ratios, wherein the filtered data signals represent the image with reduced noise.

2. The method of claim 1, wherein filtering the data signals received from each pixel comprises averaging the received data signals from the respective pixel on the basis of the data signals received from other pixels of the plurality of pixels when the respective signal-to-noise ratio of the data signals received from the respective pixel is below a first threshold.

3. The method of claim 2, wherein the other pixels of the plurality of pixels are pixels within a pre-determined window around the respective pixel.

4. The method of claim 2, further comprising determining which pixels of the plurality of pixels are the other pixels based on the respective signal-to-noise ratio of the data signal received from the respective pixel.

5. The method of claim 2, wherein filtering the data signals received from each respective pixel comprises, when the respective signal-to-noise ratio of the data signal received from the respective pixel is above the first threshold:

determining weighting coefficients based on the plurality of signal-to-noise ratios and on data coefficients calculated based on the received data signals from the plurality of pixels; and determining the filtered data signals based on the determined weighting coefficients.

6. The method of claim 5, further comprising calculating the data coefficients based on the received data signals of the respective pixel and based on the received data signals from other pixels of the plurality of pixels.

7. The method of claim 5, wherein determining the filtered data signals comprises determining the filtered data signals based on a weighted combination between the average of data from the respective pixel with data from the other pixels and a weighted combination of data from the respective pixel and from the other pixels when the respective signal-to-noise ratio of the data signal received from the respective pixel is within an interval defined by the first threshold minus a first difference and the first threshold plus the first difference.

8. The method of claim 7, wherein the other pixels are pixels within a pre-determined window around the respective pixel, and wherein the extent of the pixels within the pre-determined window around the respective pixel is determined on the basis of the respective signal-to-noise ratio of the data signal from the respective pixel.

9. The method of claim 1, wherein the data filtering device is a controller or processor comprising combinatorial logic coupled to a memory.

10. A device comprising:
a time-of-flight (ToF) sensor comprising an array of pixels, wherein the array of pixels comprises a plurality of pixels; and
a data filtering device configured to provide an output signal based on data signals generated by the array of pixels, wherein the data signals generated by the array of pixels represent an image captured by the ToF sensor, wherein the data filtering device is configured to filter data from data signals generated by the plurality of pixels based on a plurality of signal-to-noise ratios calculated on the basis of the data signals, and wherein the output signal is based on the filtered data, wherein the output signal represents the image with reduced noise, wherein the data filtering device comprises:
a calculating module configured to calculate a respective signal-to-noise ratio of the data signals from each respective pixel of the plurality of pixels to generate the plurality of signal-to-noise ratios; and
an adaptive filter configured to filter data from each respective pixel on the basis of the plurality of signal-to-noise ratios, wherein the adaptive filter is configured to average data contained in the data signals from the respective pixel with data contained in the data signals from pixels within a first pre-determined window around the pixel when the respective signal-to-noise ratio of the data signals from the respective pixel is below a first threshold, the filtered data from the respective pixel comprising the averaged data.

11. The device of claim 10, wherein the adaptive filter is configured to determine data filtered from the respective pixel on the basis of a weighted combination of data from the respective pixel and from pixels within a second pre-determined window around the respective pixel using weighting coefficients when the respective signal-to-noise ratio of the data signals from the respective pixel is above the first threshold, the weighting coefficients being determined on the basis of the respective signal-to-noise ratio of the data signals from the respective pixel and of the data signals from the pixels within the second pre-determined window around the pixel and on the basis of data coefficients calculated on the basis of data from the respective pixel and data from the pixels within the second pre-determined window around the pixel.

12. The device of claim 11, wherein the adaptive filter is configured to determine the data filtered from the respective pixel on the basis of a weighted combination between the average of the data from the respective pixel with the data from pixels within a third pre-determined window around the respective pixel, and of a weighted combination of the data from the respective pixel and of the data from pixels within the third pre-determined window around the pixel, when the respective signal-to-noise ratio of the data signal from the respective pixel is within an interval defined by the first threshold minus a first difference and the first threshold plus the first difference.

13. The device of claim 10, wherein the data filtering device further comprises a selection module configured to determine the extent of the pixels within the first pre-determined window around the respective pixel on the basis of the respective signal-to-noise ratio of the data signals from the respective pixel.

14. The device of claim 10, wherein the data filtering device is a controller or processor comprising combinatorial logic coupled to a memory.

* * * * *